United States Patent [19]
Cobb et al.

[11] Patent Number: 5,257,136
[45] Date of Patent: Oct. 26, 1993

[54] REVERSE TELEPHOTO AGRON OBJECTIVE LENS

[75] Inventors: Joshua M. Cobb, Millbrook; Franz Topolovec, Accord, both of N.Y.

[73] Assignee: International Business Machines Corporation, Armonk, N.Y.

[21] Appl. No.: 813,243

[22] Filed: Dec. 23, 1991

[51] Int. Cl.$^5$ ............................................ G02B 13/04
[52] U.S. Cl. ...................... 359/753; 359/749
[58] Field of Search .................. 359/749–753, 359/740, 795, 793

[56] References Cited

U.S. PATENT DOCUMENTS

| | | | |
|---|---|---|---|
| 3,033,082 | 5/1962 | Merigold | 88/57 |
| 3,277,784 | 10/1966 | Hudson | 88/57 |
| 3,369,853 | 2/1968 | Tolle | 350/214 |
| 3,656,839 | 4/1972 | Trotta | 350/214 |
| 3,799,655 | 3/1974 | Laiken | 359/753 |
| 3,870,401 | 3/1975 | Muszumanski | 359/751 |
| 4,291,951 | 9/1981 | Ikemori | 359/749 |
| 4,368,957 | 1/1983 | Chirra | 350/771 |
| 4,437,735 | 3/1984 | Momiyama | 359/749 |
| 5,159,493 | 10/1992 | Tsutsumi | 359/749 |

OTHER PUBLICATIONS

Patent Abstracts of Japan vol. 4, No. 153, P-33, Oct. 25, 1980 & JP-A-55 100 519, Canon, Jul. 31, 1980.
Patent Abstracts of Japan vol. 15, No. 076, C-809, Feb. 21, 1991 & JP-A-02 301 556, Mitsubishi, Dec. 13, 1990.

Primary Examiner—Bruce Y. Arnold
Assistant Examiner—James Phan
Attorney, Agent, or Firm—Floyd A. Gonzalez

[57] ABSTRACT

An air spaced reverse telephoto objective lens for use in a laser chemical vapor deposition system or the like having a quartz plate window. The objective lens includes a negative component having a first air-spaced doublet wherein each doublet element is made of crown glass and a negative meniscus crown glass element spaced from said first air-spaced doublet. The objective lens further includes an aperture stop, a positive component including second and third doublet components for effecting color correction, and a pair of bi-convex elements for effecting spherical aberration correction. The objective lens provides a common focal plane for both illuminating light and laser light passing through the objective lens and the quartz plate window.

6 Claims, 3 Drawing Sheets

TRANSVERSE RAY ABERRATIONS

DIFFRACTION MTF

REVERSE TELEPHOTO AGRON OBJECTIVE LENS

FIELD OF THE INVENTION

This invention relates to the field of optical lenses and, more particularly, reverse telephoto objective lens with a long working distance for projecting and focusing a finely focused spot of light at a significant distance from the exit lens element.

BACKGROUND OF THE INVENTION

In manufacturing processes which use a vapor deposition technique, a vapor of a metal such as gold is created within a vacuum chamber which contains the workpiece. The workpiece is held on a movable stage such that it may be moved relative to a window which is typically a quartz plate in the wall of the vacuum chamber. In order to deposit the gold onto the substrate, a laser beam is used to locally heat a very, very small region of the silicon substrate. The heating of the substrate creates a condition and environment which permits the gold molecules to deposit out of the vapor form onto the surface of the silicon substrate.

The gold molecules, when deposited on the silicon substrate, may create electrical conductors on the insulations. In order to create extremely fine electrically conductive paths on the insulation surface of the silicon, it is necessary to very, very finely focus the laser beam while at the same time passing the focused laser beam through the quartz plate which serves as the window into the working vacuum chamber.

Since the lens elements must all remain outside the vacuum chamber, it is necessary for the lens assembly to have a sufficiently long back working distance between the exit or last element and the focal point such that the focused beam may be passed through the quartz plat and sufficiently inside the vacuum chamber to focus on the surface of the silicon slab where the gold molecules of the gold vapor are to be deposited. The reverse telephoto nature of a lens displaces the principle point outside the lens assembly providing a longer back working distance between the lens assembly and the focal point, while maintaining a relatively short focal length.

In order to project the maximum amount of illumination from the laser and the laser beam onto the focus point within the vacuum chamber of the vapor deposition device, it is necessary to expand the laser beam as received from the laser from a 1.6 millimeter diameter to approximately a 10.8 millimeter diameter where the beam enters the reverse telephoto objective lens of this invention. By expanding the beam to that diameter, the maximum beam diameter may be then introduced into the reverse telephoto lens thus causing the maximum controllable focus into an extremely fine point of approximately 3.14 microns airy disk diameter. Lenses for such expansion are known in the art.

OBJECTS OF THE INVENTION

It is an object of the invention to accurately focus a beam of coherent laser light to an extremely fine focal point, and to cause the focal point to be positioned at a substantial distance from the exit element of the lens.

It is another object of the invention to focus an expanded entering beam of coherent radiation from a laser into a finely controlled focused point of light on the opposite side of a quartz plate.

It is a further object of the invention to focus the light of an expanded coherent radiation beam within a vapor deposition vacuum chamber.

SUMMARY OF THE INVENTION

The focusing of the entering beam of coherent laser radiation into the extremely fine focus point within the vacuum chamber of a vapor deposition apparatus is accomplished by a lens having a negative component and a positive component. The negative component is comprised of a doublet component and a negative miniscus element. The positive component is comprised of two doublets and two bi-convex elements.

The entire lens apparatus is color corrected for selected light frequencies by the selection of appropriate glasses for the elements of the lens. However, each element of the lens is not an individually color corrected element.

The elements are air spaced from each other to avoid the effects caused by cementing lenses thereby avoiding the absorption of the energy by the cement of cemented lens assemblies. By avoiding the absorption of the light and energy, the cracking of the cement or lens elements due to heat build up is avoided.

Due to the color correction of the overall lens assembly, the same lens may be used not only for focusing of the laser beam at the desire point and to the desired diameter, but also may be used for visual of inspection of the work.

The objects of the invention are accomplished and the shortcomings and deficiencies of the prior art such as cemented element lenses are overcome by the selection of materials, the accurate formation of each individual lens element together with the accurate placement and spacing of the lens elements from the adjacent lens elements as will be better understood from reference to the drawing and the detailed description of the invention to follow.

DETAILED DESCRIPTION OF THE INVENTION

Figure 1:
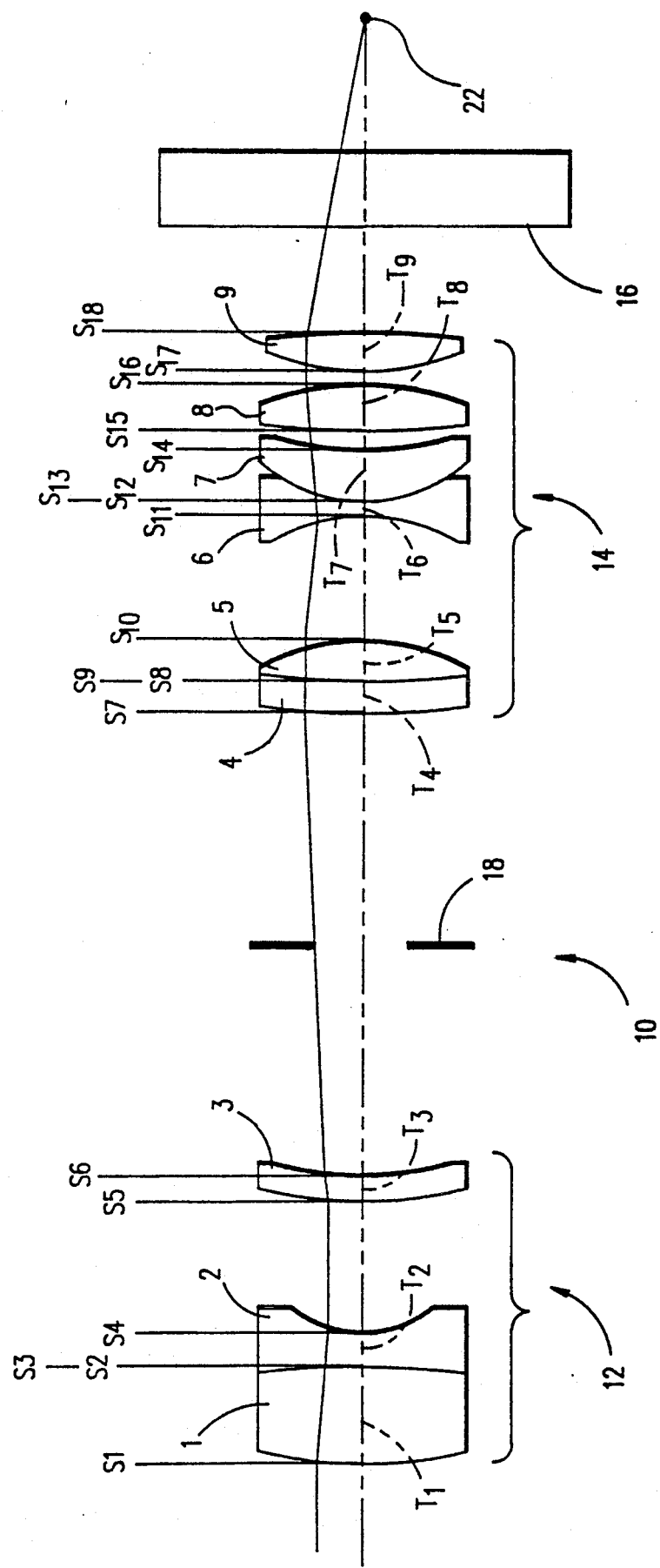
FIG. 1 illustrates the lens elements and their spacing relative to each other and to the quartz plate which forms the window of the vapor deposition gas chamber.
Figure 2D:
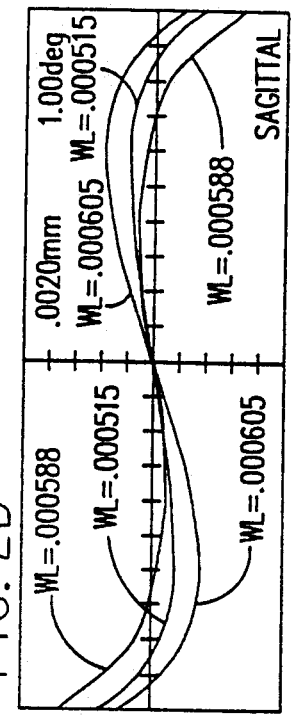
FIG. 2 is formed of three color transverse ray aberration plots for the lens of FIG. 1 on axis and the tangential and sagittal plots for the off axis points at one degree and two degrees field angles, as labeled.
Figure 2E:
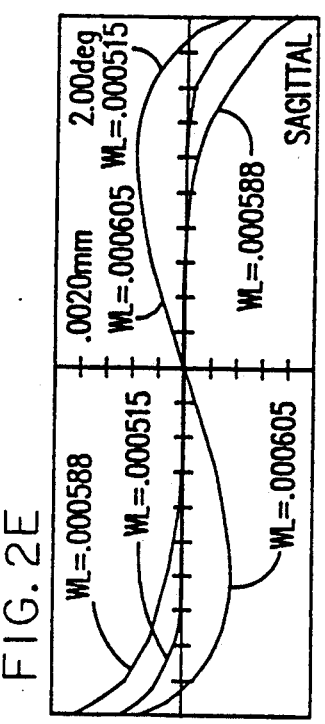
Figure 2A:
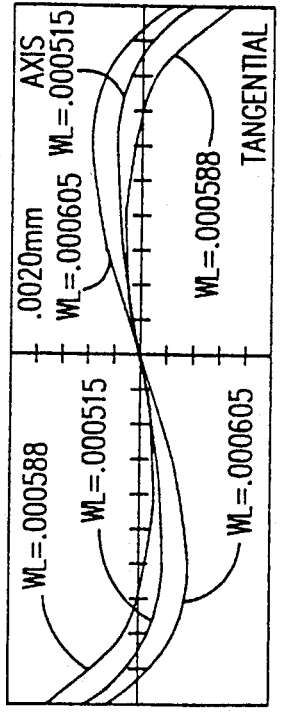
Figure 2B:
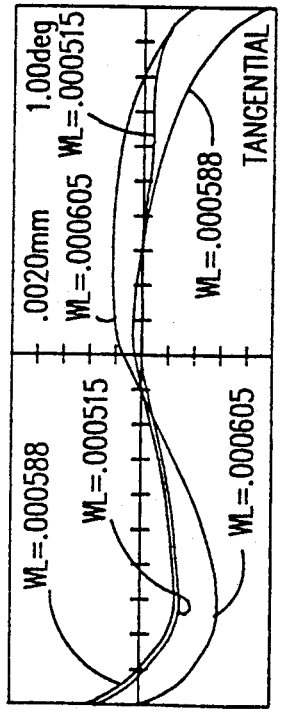
Figure 2C:
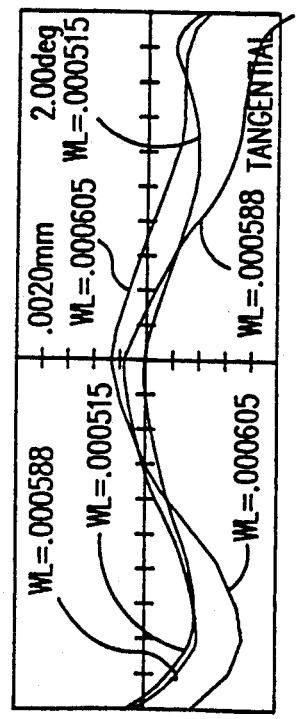
Figure 3D:
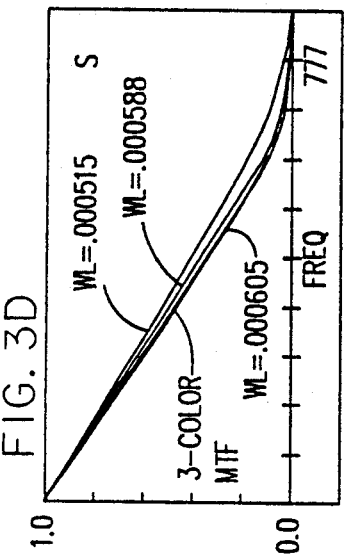
FIG. 3 is formed of three color diffraction MTF plots for the lens of FIG. 1 on axis and the tangential (T) and sagittal (S) plots for the off axis points at one degree and two degrees field angles, as labeled.
Figure 3E:
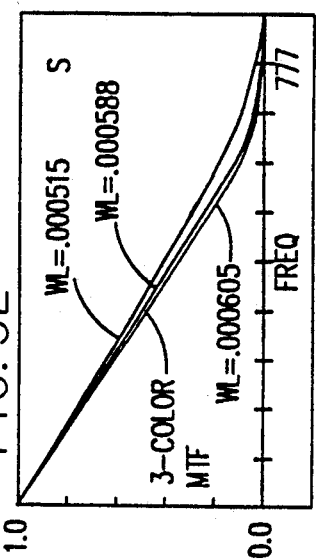
Figure 3A:
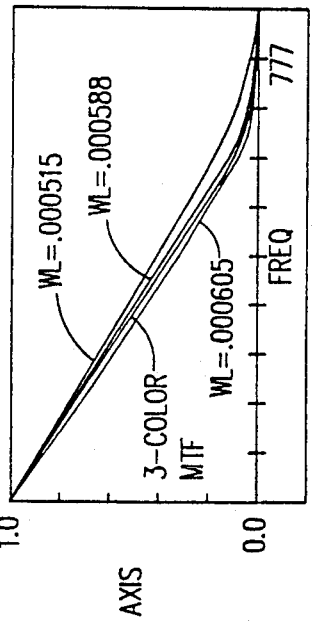
Figure 3B:
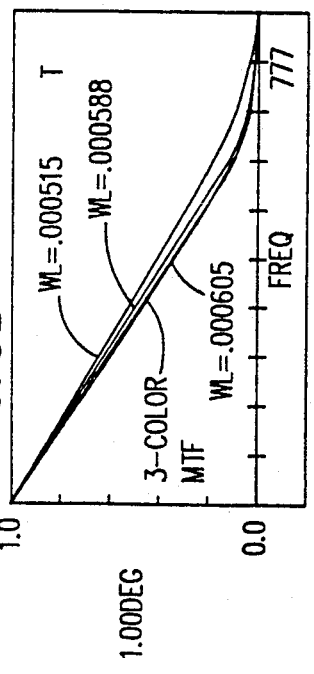
Figure 3C:
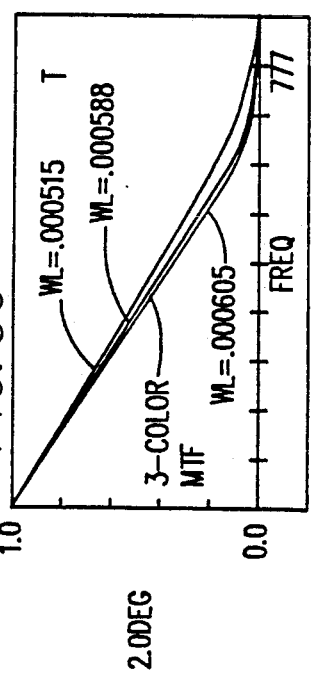

With reference to the drawing, the nine lens elements of the reverse telephoto argon objective lens are illustrated together with other pertinent elements of the optical system.

The mounting hardware uses conventional materials and fabrication techniques to insure that the lens elements remain in their proper relative positions. Preferred materials are stainless steel to avoid thermal expansion over the long barrel length of the lens assembly.

The reverse telephoto lens 10 shown in FIG. 1 is comprised of a negative component 12 which is further comprised of lens elements 1, 2 and 3. Negative component 12 acts to spread the light beam that enters surface S1 of lens element 1 so that the light beam diameter may be controlled by aperture stop 18. The two separate glass lens elements 1 and 2 are selected from the available glass types to help color correct the lens. Additionally, the negative component acts to move the principle point of the lens assembly and positions the principle surface outside the lens assembly and toward the focal point. This displacement of the principle surface increases the back working distance to permit the projecting of the beam of laser light well within the chamber of the vapor deposition equipment. The shifting of the principle surface also shortens the focal length of the lens assembly.

The positive component 14 of the lens assembly 10 is illustrated to the right of the aperture stop 18 and is comprised of two doublet lens elements 4 and 5 and lens elements 6 and 7 together with bi-convex elements 8 and 9.

Again, doublets 4, 5 and 6, 7 further act to color correct the lens by the judicious selection of glass types. Color correction is not normally necessary for laser lenses since the laser is monochromatic. However, the color correction of the lens over a band of orange light is desirable since the lens is used in a dual purpose role with the other purpose being an objective lens of a viewing system such as a television type inspection camera. The camera provides signals to a monitor to display the work area. The orange illumination light may be focused by the lens on the work area. The reflected orange illumination provides the image for the inspection camera.

Positive components 14 take the diverged beam passing through aperture stop 18 and focuses the rays of the beam to a focal point 22. In route from lens element 9 to focal point 22, the focused beam passes through quartz plate 16 which is a window in the wall of the vapor deposition gas chamber with which this lens assembly is used.

Reference is made to the table which follows below which sets forth the significant parameters of the individual lens elements, together with the respective spacing between lens elements.

All dimensions are expressed in terms of millimeters. The lens element numbers correspond to the reference numerals associated with a lens element in the drawing while the surfaces are designated by an S with a numeral, the numeral corresponding to the numerical sequence of the surface starting with the entering surface and terminating with the exit surface of the lens assembly. The radius of the spherical surface of each lens element is expressed as a positive number where the center of the radius is to the right of the surface as shown in the drawing and a negative number where the center of the radius is located to the left of the surface referred to, as illustrated in the drawing.

The thickness of the lens is expressed in a linear thickness of millimeters measured at the axis of the lens.

The air spacing is designated in the form of $D_{x-y}$. The x and the y are the lens numbers immediately adjacent the air space distance. Thus, for example, the air space between lenses 4 and 5 would be $D_{4-5}$.

The column headed "Glass" utilizes the glass designations found on a Schott Glass Map published by Schott Glass Technologies. The use of a designation on the Schott glass map are as a matter of convenience. The alternative technique for disclosing the characteristics of the glass is by expressing the index of refraction and the Abbe' V number.

The columns designated Index @ $\lambda$ and a number followed by the symbol for microns is the refraction index for that particular wavelength of light. Three separate wavelengths of light are illustrated for purposes of defining the refractive index of the glass. The Abbe' V number is likewise shown for each glass selection.

TABLE 1

| LENS L | RADIUS OF SURFACE | THICKNESS TL | AIRSPACE $D_{X-Y}$ | CLEAR APERTURE | LENS MATERIAL | INDEX@$\lambda$ = 0.5146$\mu$ | INDEX@$\lambda$ = 0.6050$\mu$ | INDEX@$\lambda$ = 0.5876$\mu$ | ABBE V NO |
|---|---|---|---|---|---|---|---|---|---|
| 1 | S1 = 43.64 | 17.55 | | 26.0 | LAK 28 | 1.751023 | 1.743025 | 1.744284 | 50.77 |
|   | S2 = −186.85 |  | 0.025 |  |  |  |  |  |  |
| 2 | S3 = −186.85 | 3.51 |  | 26.0 | BK 10 | 1.501225 | 1.497173 | 1.497820 | 66.95 |
|   | S4 = 17.09 |  | 10.00 |  |  |  |  |  |  |
| 3 | S5 = 99.80 | 3.56 |  | 26.0 | LAK 9 | 1.696803 | 1.689912 | 1.691000 | 54.71 |
|   | S6 = 48.42 |  | 57.95 |  |  |  |  |  |  |
| 4 | S7 = 998.80 | 5.90 |  | 27.0 | F 5 | 1.610735 | 1.602077 | 1.603417 | 38.03 |
|   | S8 = 112.75 |  | 0.84 |  |  |  |  |  |  |
| 5 | S9 = 62.74 | 6.30 |  | 27.0 | LAKN 7 | 1.656713 | 1.650638 | 1.651598 | 58.52 |
|   | S10 = −35.14 |  | 9.00 |  |  |  |  |  |  |
| 6 | S11 = −25.00 | 2.16 |  | 26.0 | SF 12 | 1.657149 | 1.646697 | 1.648306 | 33.84 |
|   | S12 = 20.93 |  | 0.025 |  |  |  |  |  |  |
| 7 | S13 = 20.93 | 6.50 |  | 26.0 | LAK 10 | 1.726562 | 1.718770 | 1.719997 | 50.42 |
|   | S14 = 31.82 |  | 2.50 |  |  |  |  |  |  |
| 8 | S15 = 58.85 | 6.50 |  | 26.0 | LAKN 7 | 1.656713 | 1.650638 | 1.651598 | 58.52 |
|   | S16 = −54.94 |  | 0.08 |  |  |  |  |  |  |
| 9 | S17 = 31.61 | 4.94 |  | 26.0 | LAKN 7 | 1.656713 | 1.650638 | 1.651598 | 58.52 |
|   | S18 = −129.80 |  |  |  |  |  |  |  |  |

Individual lens elements fabricated to the dimensions indicated in the above table with a thickness tolerance of plus or minus 25.0 microns, diameter tolerances of plus 0 minus 25.0 microns and the radiuses of the surfaces to less than one fringe sphericity and to less than one fringe of power. The lens elements are then positioned relative to each other and held relative to the aperture stop 18 such that an air gap to the left of the aperture stop has a 28.25 millimeter length and the air gap to the right of the aperture stop has a 29.70 millimeter length. This assembly results in an air gapped reverse telephoto lens which will focus an entering laser beam having an entrance diameter of approximately 10.8 millimeters to an extremely fine 3.14 micron Airy Disk diameter at the focal point 22 where the back working distance of this lens assembly is about 42.0 millimeters.

Since the diameter of the Airy Disk is a function of the focal length of the lens, according to the formula:

$$\phi = \frac{2.44 \lambda F}{D} \text{ where}$$

$\phi$ = Diameter of the Airy Disk,
$\lambda$ = Wavelength of light,
F = Focal length, and
D = Diameter of entering laser beam, it is highly desirable to have a small focal length to allow the use of a smaller diameter entering laser beam. By using a reverse telephoto lens arrangement, the focal length may be smaller than a non-reverse telephoto lens, while maintaining a larger back working distance. The need for unduly large entering laser beams complicates the design of equipment, particularly the beam spreading lens necessary to precede the reverse telephoto lens. The long back working distance affords adequate room to insert the quartz plate 16 between the exit lens element 9 and the focal point 22.

It is preferred that all nine element 1-9 of the lens assembly 10 be coated with a broad band anti-reflection coating which is formulated to be peaked at 0.5145 micron wavelength.

Referring to FIGS. 2 and 3, it is readily seen that a lens assembly made according to this description is not aberration limited, but is limited only by diffraction. The transverse ray aberration plots of FIG. 2 shows very little degradation due to aberrations and vary from perfect by only approximately 1.5 microns while the lens has an Airy Disk diameter of about 3.14 microns for the lens F stop of 2.5. The diffraction MTF plots, FIG. 3, illustrates that the lens will have limitations due to diffraction.

The lens assembly is corrected for use with a 16 millimeter quartz plate 16. The foregoing lens further has an effective focal length of 27.0 millimeters, a working numerical aperture of 0.2, lens thickness, glass only, of 137.25 millimeters and a workable field of view plus or minus 2.0 millimeters (plus or minus 4.2 degrees) with color correction corrected for a band of wavelengths between 0.5876 and 0.6328 microns in the visible spectrum and highly corrected for wavelengths of 0.5145 microns, and 0.5876 microns and 0.6050 microns.

The foregoing is a description of the invention we desire to protect by Letters Patent is defined by the claims that follow.

We claim:

1. An air spaced reverse telephoto type/objective lens for use in a laser chemical vapor deposition system having a quartz window, said objective lens comprising, from the object side to the image side:
   a negative component including a first air-spaced doublet wherein each doublet element is made of crown glass having an Abbe' V number greater than 50 and a negative meniscus crown glass element spaced from said first air-spaced doublet;
   an aperture stop; and
   a positive component including second and third air-spaced doublet components for effecting color correction and a pair of bi-convex elements for effecting spherical aberration correction;
   said objective lens providing a common focal plane for both illuminating light and laser light passing through said objective lens and said quartz plate window.

2. The lens of claim 1 wherein said lens elements conform to the radius and the materials set forth in the table following:

| Lens # | Surface Radius | Material |
|---|---|---|
| 1 | S1 = 43.64 | LAK 28 |
|   | S2 = −186.85 |   |
| 2 | S3 = −186.85 | BK 10 |
|   | S4 = 17.09 |   |
| 3 | S5 = 99.80 | LAK 9 |
|   | S6 = 48.42 |   |
| 4 | AS7 = 998.80 | F 5 |
|   | S8 = 112.75 |   |
| 5 | S9 = 62.74 | LAKN 7 |
|   | S10 = −35.14 |   |
| 6 | S11 = −25.00 | SF 12 |
|   | S12 = 20.93 |   |
| 7 | S13 = 20.93 | LAK 10 |
|   | S14 = 31.82 |   |
| 8 | S15 = 58.85 | LAKN 7 |
|   | S6 = −54.94 |   |
| 9 | S17 = 31.61 | LAKN 7 |
|   | S18 = −129.80 |   | wherein surfaces are designated from the surface laser light enters first and progresses to the surface said laser light exits with each lens element having an odd and even numbered surface in ascending order respectively.

3. The lens of claim 2 wherein the inter lens air spacing at the axis of the lens, $D_{x-y}$, with the x and y being surface numbers bounding said inner lens air spacing, in millimeters are $D_{2-3}=0.025$; $D_{4-5}=10.00$; $D_{6-7}=57.95$; $D_{8-9}=0.84$; $D_{10-11}=9.00$; $D_{12-13}=0.025$; $D_{14-15}=2.50$; and $D_{16-17}=0.08$.

4. The lens of claim 3 wherein each said lens element comprises an anti-reflective coating.

5. The lens of claim 3 wherein said aperture stop is disposed between lens surfaces 6 and 7.

6. An air spaced reverse telephoto lens comprising a plurality of lens elements designated by lens numbers, 1-9;
   said lens elements having center lens element distances separating them designated $D_{x-y}$, where x and y are lens numbers for lenses defining said center lens distances;
   said lens elements each having an entry surface and an exit surface, each said surface having a radius;
   each of said lens elements further having a thickness $T_L$;
   each of said lens elements being fabricated from a designated material;
   and said lens numbers, surface numbers, radius, thickness, center lens element distance and material conforming to specifications set out in a table below:

| LENS # | RADIUS OF SURFACE | THICKNESS $T_L$ | AIRSPACE $D_{X-Y}$ | CLEAR APERTURE | LENS MATERIAL | INDEX@λ = 0.5146μ | INDEX@λ = 0.6050μ | INDEX@λ = 0.5876μ |
|---|---|---|---|---|---|---|---|---|
| 1 | S1 = 43.64 | 17.55 |  | 26.0 | LAK 28 | 1.751023 | 1.743025 | 1.744284 |
|   | S2 = −186.85 |  | 0.025 |  |  |  |  |  |
| 2 | S3 = −186.85 | 3.51 |  | 26.0 | BK 10 | 1.501225 | 1.497173 | 1.497820 |
|   | S4 = 17.09 |  | 10.00 |  |  |  |  |  |

-continued

| LENS # | RADIUS OF SURFACE | THICK-NESS TL | AIR-SPACE $D_{x\cdot y}$ | CLEAR APER-TURE | LENS MATERIAL | INDEX@λ = 0.5146μ | INDEX@λ = 0.6050μ | INDEX@λ = 0.5876μ |
|---|---|---|---|---|---|---|---|---|
| 3 | S5 = 99.80 | 3.56 | | 26.0 | LAK 9 | 1.696803 | 1.689912 | 1.691000 |
| | S6 = 48.42 | | 57.95 | | | | | |
| 4 | S7 = 998.80 | 5.90 | | 27.0 | F 5 | 1.610735 | 1.602077 | 1.603417 |
| | S8 = 112.75 | | 0.84 | | | | | |
| 5 | S9 = 62.74 | 6.30 | | 27.0 | LAKN 7 | 1.656713 | 1.650638 | 1.651598 |
| | S10 = −35.14 | | 9.00 | | | | | |
| 6 | S11 = −25.00 | 2.16 | | 26.0 | SF 12 | 1.657149 | 1.646697 | 1.648306 |
| | S12 = 20.93 | | 0.025 | | | | | |
| 7 | S13 = 20.93 | 6.50 | | 26.0 | LAK 10 | 1.726562 | 1.718770 | 1.719997 |
| | S14 = 31.82 | | 2.50 | | | | | |
| 8 | S15 = 58.85 | 6.50 | | 26.0 | LAKN 7 | 1.656713 | 1.650638 | 1.651598 |
| | S16 = −54.94 | | 0.08 | | | | | |
| 9 | S17 = 31.61 | 4.94 | | 26.0 | LAKN 7 | 1.656713 | 1.650638 | 1.651598 |
| | S18 = −129.80 | | | | | | | |

* * * * *